(12) United States Patent
Martin et al.

(10) Patent No.: US 8,877,050 B2
(45) Date of Patent: Nov. 4, 2014

(54) PROCESS FOR THE TREATMENT OF LIQUID EFFLUENTS LADEN WITH HYDROCARBONS

(75) Inventors: Christian Martin, Artolsheim (FR); Rene Pascal, Guebwiller (FR)

(73) Assignee: Osead Hydrocarbon Technologies, SAS, Paris (FR)

( * ) Notice: Subject to any disclaimer, the term of this patent is extended or adjusted under 35 U.S.C. 154(b) by 603 days.

(21) Appl. No.: 12/995,026

(22) PCT Filed: May 28, 2008

(86) PCT No.: PCT/FR2008/000729
§ 371 (c)(1), (2), (4) Date: Nov. 29, 2010

(87) PCT Pub. No.: WO2009/144388
PCT Pub. Date: Dec. 3, 2009

(65) Prior Publication Data
US 2011/0076750 A1    Mar. 31, 2011

(51) Int. Cl.
| | | |
|---|---|---|
| *B01D 15/00* | (2006.01) | |
| *B01J 20/00* | (2006.01) | |
| *B01D 35/00* | (2006.01) | |
| *B01D 29/00* | (2006.01) | |
| *B01D 24/00* | (2006.01) | |
| *C02F 1/28* | (2006.01) | |
| *C02F 1/24* | (2006.01) | |
| *B01J 20/34* | (2006.01) | |
| *B01D 17/02* | (2006.01) | |
| *C02F 9/00* | (2006.01) | |
| *C02F 101/32* | (2006.01) | |
| *C02F 1/00* | (2006.01) | |
| *C02F 1/26* | (2006.01) | |

(52) U.S. Cl.
CPC . *C02F 1/285* (2013.01); *C02F 9/00* (2013.01); *C02F 2101/32* (2013.01); *C02F 2303/16* (2013.01); *C02F 1/008* (2013.01); *C02F 1/24* (2013.01); *B01D 15/00* (2013.01); *B01J 20/34* (2013.01); *B01D 17/0202* (2013.01); *C02F 1/26* (2013.01); *C02F 2303/26* (2013.01)
USPC ........ 210/198.1; 210/269; 210/205; 210/209; 210/93; 210/189; 210/219; 210/221.1; 210/265; 210/266; 210/519; 210/523; 210/538; 210/662; 210/670; 210/674; 210/691; 210/739; 210/96.1; 210/259; 210/270; 210/360.1

(58) Field of Classification Search
CPC .................................................. C02F 2209/03
See application file for complete search history.

(56) References Cited

U.S. PATENT DOCUMENTS

| | | | | | |
|---|---|---|---|---|---|
| 2,585,491 | A | * | 2/1952 | Olsen ............................ | 585/821 |
| 2,614,133 | A | * | 10/1952 | Ockert .......................... | 585/821 |

(Continued)

FOREIGN PATENT DOCUMENTS

WO    WO 94/14513    7/1994

OTHER PUBLICATIONS

International Search Report issued in International Application No. PCT/FR2008/000729 on May 18, 2009 (with translation).

(Continued)

*Primary Examiner* — Matthew O Savage
*Assistant Examiner* — Benjamin J Behrendt
(74) *Attorney, Agent, or Firm* — Oliff PLC

(57) ABSTRACT

The present invention relates to a process for the treatment of liquid effluents laden with hydrocarbons, which comprises: feeding the effluents into a treatment tank; supplying the treatment tank with a reversible sorbent having a defined particle size; mixing the effluents with the reversible sorbent in the treatment tank in order to load said reversible sorbent with the hydrocarbons in the effluents; removing the hydrocarbon-laden reversible sorbent from the top of the treatment tank; extracting the treated effluents from the bottom of the treatment tank; and separating the hydrocarbons from the laden reversible sorbent from the treatment tank.

11 Claims, 3 Drawing Sheets

(56) References Cited

U.S. PATENT DOCUMENTS

Figure 1:
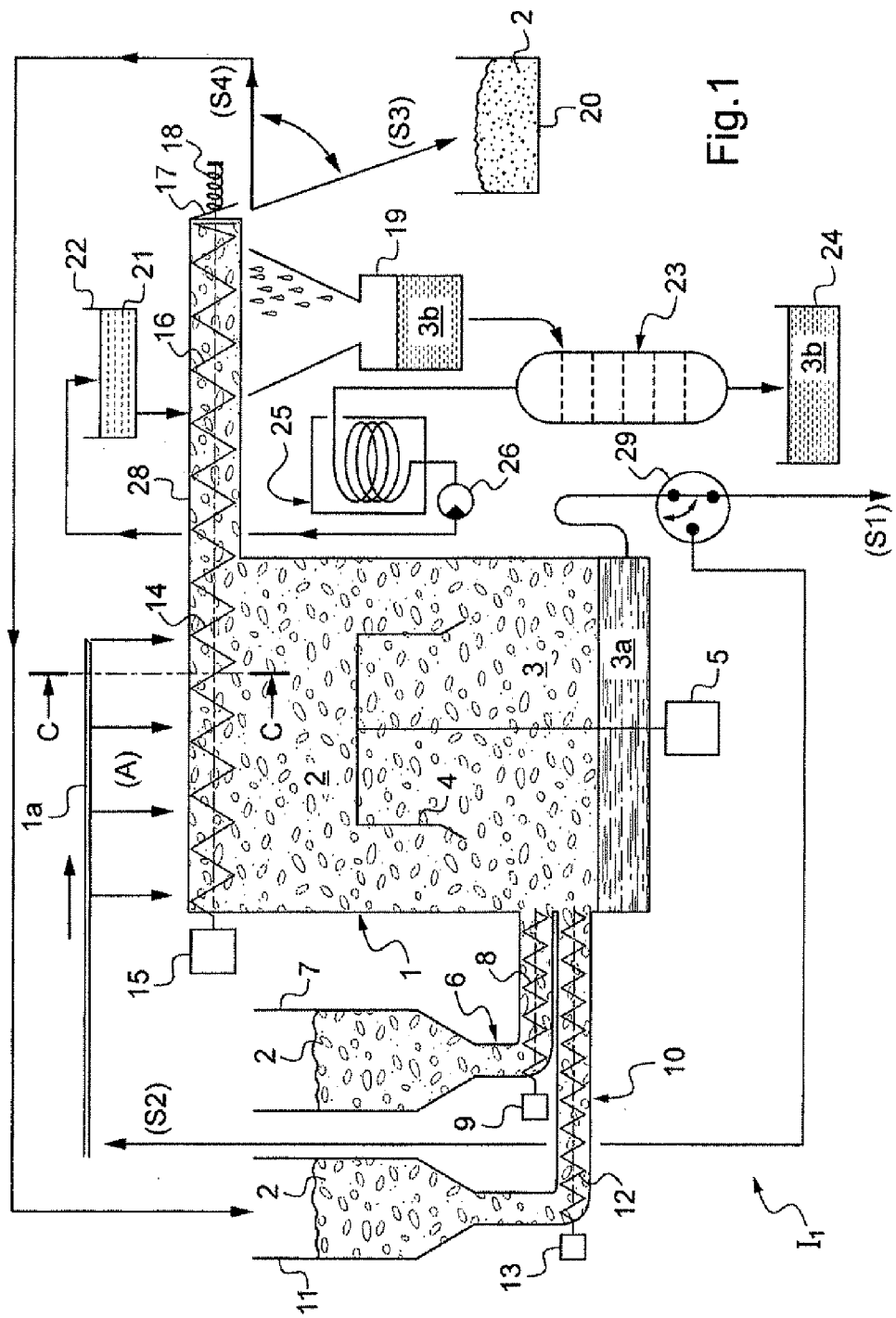

| | | | |
|---|---|---|---|
| 3,674,684 A | * | 7/1972 | Gollan .......................... 210/675 |
| 3,798,158 A | * | 3/1974 | Bunn .............................. 10/671 |
| 4,279,756 A | | 7/1981 | Weiss et al. |
| 4,461,579 A | * | 7/1984 | McCallum ................... 366/337 |
| 4,478,803 A | | 10/1984 | Zambrano |
| 4,661,256 A | | 4/1987 | Johnson |
| 4,752,397 A | | 6/1988 | Sood |
| 5,135,656 A | | 8/1992 | Means et al. |
| 5,330,636 A | * | 7/1994 | Reichert ...................... 210/96.1 |
| 5,534,153 A | | 7/1996 | Scott et al. |
| 6,358,422 B1 | * | 3/2002 | Smith et al. .................. 210/691 |
| 2006/0000785 A1 | * | 1/2006 | Moller .......................... 210/760 |
| 2006/0157397 A1 | * | 7/2006 | Yokota .......................... 210/266 |

OTHER PUBLICATIONS

Written Opinion of the International Searching Authority issued in International Application No. PCT/FR2008/000729 on May 18, 2009 (with translation).

International Preliminary Report on Patentability issued in International Application No. PCT/FR2008/000729 on May 18, 2009 (with translation).

\* cited by examiner

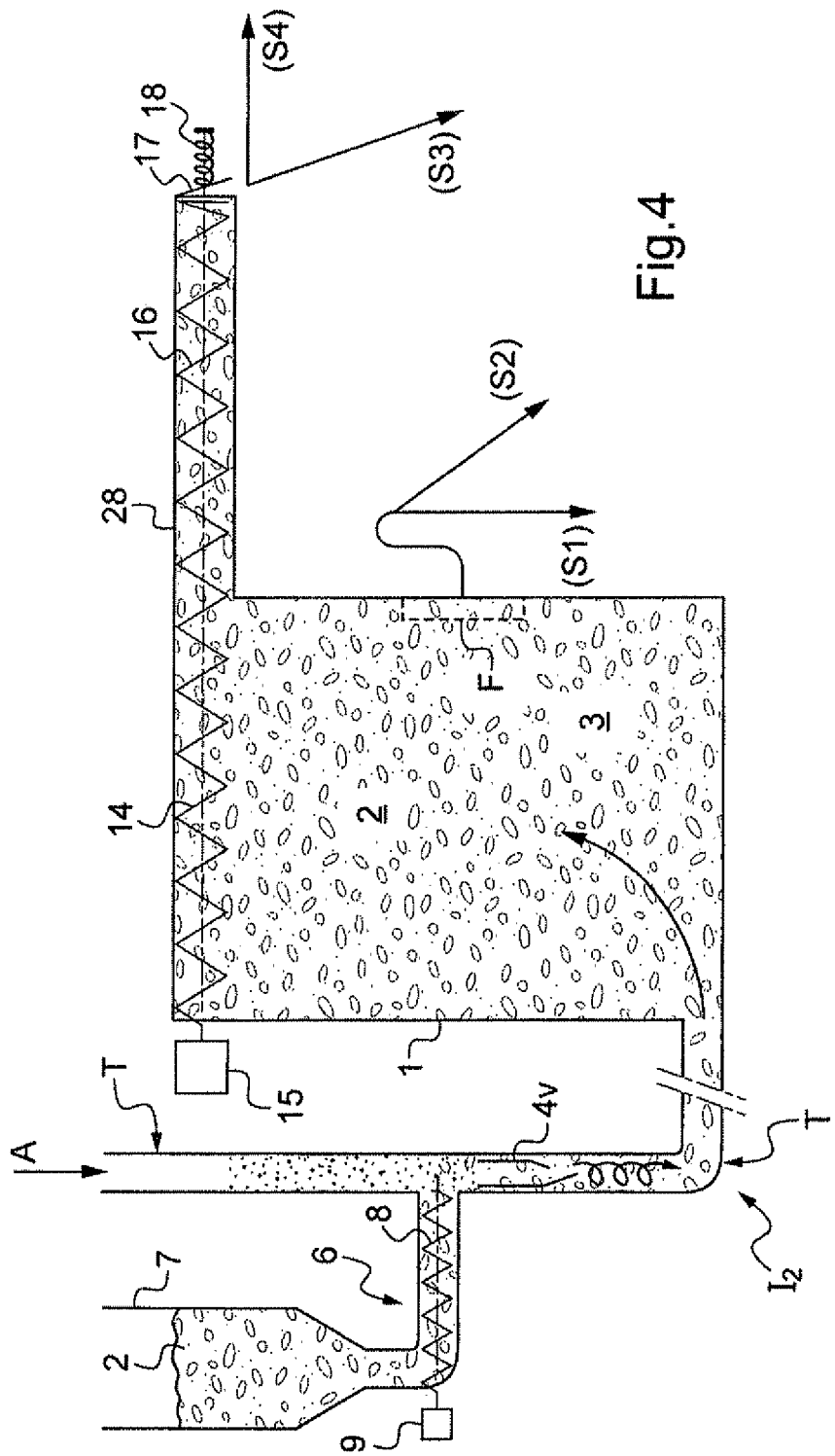

PROCESS FOR THE TREATMENT OF LIQUID EFFLUENTS LADEN WITH HYDROCARBONS

This invention relates to the general technical field of treating effluents laden with hydrocarbons. These are, for example, industrial effluents such as industrial wastewater, separator water, pond wastewater, and subsurface water. The effluents can also come from refineries, oil extraction sites, tanker maintenance sites in ports, or industrial and chemical sites.

Current techniques for disposing of hydrocarbon-laden water fail to take environmental conservation adequately into account. These techniques consist essentially of pumping this water, transporting it, and incinerating it in facilities that consume large amounts of energy and favor greenhouse effects. Moreover, the water is not recovered, which counteracts the objective of conserving this increasingly valuable substance.

The goal of this invention is to propose a novel method for treatment of hydrocarbon-laden effluents that overcomes the drawbacks stated above and uses a neutral, recyclable product.

Another goal of this invention is to propose a treatment method that discharges the treated and reinjectable effluents into a traditional water purification loop or is reusable in a process, thus reducing consumption.

Another goal of this invention is to reduce the costs associated with implementing a method for treating hydrocarbon-laden effluents.

Another goal of this invention is to provide a simple, reliable treatment facility for implementing the aforesaid process.

The goals of this invention are achieved with the aid of a hydrocarbon-laden liquid effluent treatment method consisting of:
  conducting the effluents into a treatment vessel,
  feeding a reversible sorbent with a given particle size into the treatment vessel,
  mixing the effluents with a reversible sorbent to charge said reversible sorbent with hydrocarbons contained in the effluents,
  evacuating the hydrocarbon-laden reversible sorbent at the top of the treatment vessel,
  extracting the treated effluents from the treatment vessel,
  and separating the hydrocarbons from the charged reversible sorbent coming from the treatment vessel.

According to one embodiment of the invention, the treatment process consists of using the reversible sorbent separated from the hydrocarbons and reintroducing it into the treatment vessel.

According to one embodiment of the invention, the treatment process consists of introducing, into the treatment vessel, a given amount of reversible sorbent composed at least in part of reversible sorbent already used in the treatment.

According to one embodiment of the invention, the treatment process consists of continually monitoring the residual hydrocarbon concentration of the treated effluents extracted from the treatment vessel to prevent any release of polluted water.

According to one embodiment of the invention, the treatment process consists of determining, based on the residual hydrocarbon concentration, whether or not the treated effluents are evacuated and reintroduced into the treatment vessel in order to undergo an additional treatment cycle therein.

According to one embodiment of the invention, the treatment process consists of determining the hydrocarbon concentration of the liquid effluents introduced into the treatment vessel and adjusting the amount of reversible sorbent introduced into the treatment vessel as a function of said concentration.

According to one embodiment of the invention, the treatment process consists of determining the ability of the reversible sorbent to trap the hydrocarbons before reuse.

According to one embodiment of the invention, the treatment process consists of desorbing the hydrocarbon-laden reversible sorbent coming from the treatment vessel, using mechanical, thermal, chemical, or biological means employing bacteria. The desorption operation can where appropriate be supplemented with ultrasound or microbubbling treatment, or with treatment using a pulsed system.

The goals of this invention are also achieved with the aid of a first facility for treating hydrocarbon-laden liquid effluents, particularly for implementing the treatment method presented above, said facility having:
  a treatment vessel for recovering the liquid hydrocarbon-laden effluents,
  a system for feeding the treatment vessel with virgin reversible sorbent,
  an additional system for feeding the treatment vessel with recycled reversible sorbent,
  a mixer disposed in the treatment vessel to mix the liquid phase of the effluents and the solid phase of the reversible sorbent designed to trap the hydrocarbons,
  a means for evacuating the hydrocarbon-trapping reversible sorbent at the top of the treatment vessel,
  a means for bringing the hydrocarbon-trapping reversible sorbent to a mechanical, thermal, chemical, or biological desorption system,
  a means for extracting the treated liquid effluents at the bottom of the treatment vessel,
  and means for separate recovery of the hydrocarbons and reversible sorbent coming from the desorption system.

The goals of this invention are also achieved with the aid of a second facility for treating hydrocarbon-laden liquid effluents, particularly for implementing the treatment method presented above, said facility having:
  a treatment vessel for recovering the hydrocarbon-laden liquid effluents with the aid of a feed tube leading into the treatment vessel,
  a system for feeding the treatment vessel with virgin or recycled reversible sorbent, said feed system injecting the reversible sorbent into the feed tube,
  a means for generating a vortex in the feed tube downstream of the injection of the reversible sorbent, favoring the mixing of the effluent liquid phase with the reversible sorbent solid phase,
  a means for evacuating the hydrocarbon-trapping reversible sorbent at the top of the treatment vessel,
  a means for conducting the reversible sorbent trapping the hydrocarbons to a desorption system,
  a means for extracting the treated liquid effluents from the treatment vessel,
  and means for separate recovery of the hydrocarbons and the reversible sorbent coming from the desorption system.

This second treatment facility may prove more effective than the first in certain hydrocarbon composition and concentration cases.

The goals of this invention are also achieved with the aid of a system for treating hydrocarbon-laden liquid effluents, particularly for implementing the treatment method presented above, said treatment system having a first treatment facility as described above as well as a unit for effluent pretreatment or posttreatment upstream or downstream respectively of the first treatment facility, said pretreatment or posttreatment unit having a second treatment facility as described above.

In certain cases of hydrocarbon composition and concentration in the effluents to be treated, it may prove necessary to resort to pretreatment or posttreatment of the effluents to improve treatment effectiveness.

The particular embodiments of the treatment facility according to the invention and described hereinbelow may relate to the first and/or the second treatment facility.

According to one embodiment of the invention, the treatment facility has a means for rerouting the reversible sorbent coming from the desorption system into the treatment vessel.

According to one embodiment of the invention, the treatment facility has an optional system for adding solvent to the reversible sorbent trapping the hydrocarbons and evacuated from the treatment vessel.

According to one embodiment of the invention, the treatment facility has, downstream of the hydrocarbon recovery means, a distiller-evaporator apparatus for separating the solvent from the hydrocarbons, as well as a condenser for recovering the liquid phase solvent for reutilization purposes.

According to one embodiment of the invention, the treatment facility has a means for monitoring the hydrocarbon concentration of the effluents to be treated.

According to one embodiment of the invention, the treatment facility has a means for monitoring the residual hydrocarbon concentration of the effluents extracted at the bottom of the treatment vessel.

According to one embodiment of the invention, the treatment facility has a means for monitoring the ability of the recycled reversible sorbent to trap the hydrocarbons.

According to one embodiment of the invention, the treatment facility has a means for controlling the reversible sorbent feed of the treatment vessel as a function of the hydrocarbon concentration in the effluents to be treated.

According to one embodiment of the treatment facility according to the invention, the treatment vessel is surmounted by two perforated sloping walls in order to converge at a substantially central position in which the evacuation means of the screw conveyor type is located, whereby the effluents to be treated penetrate into the treatment vessel through the perforated walls.

Figure 5:
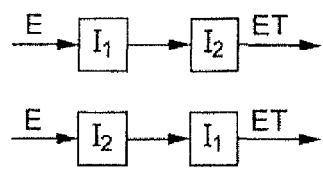
Figure 2:
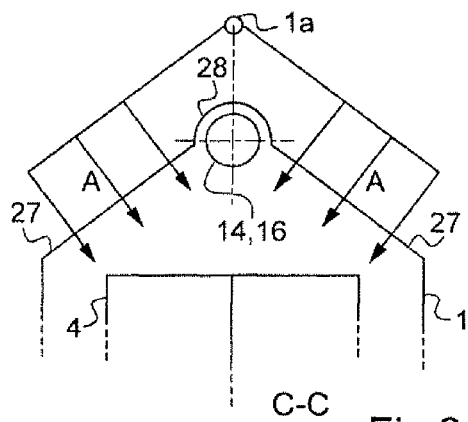
Figure 3:
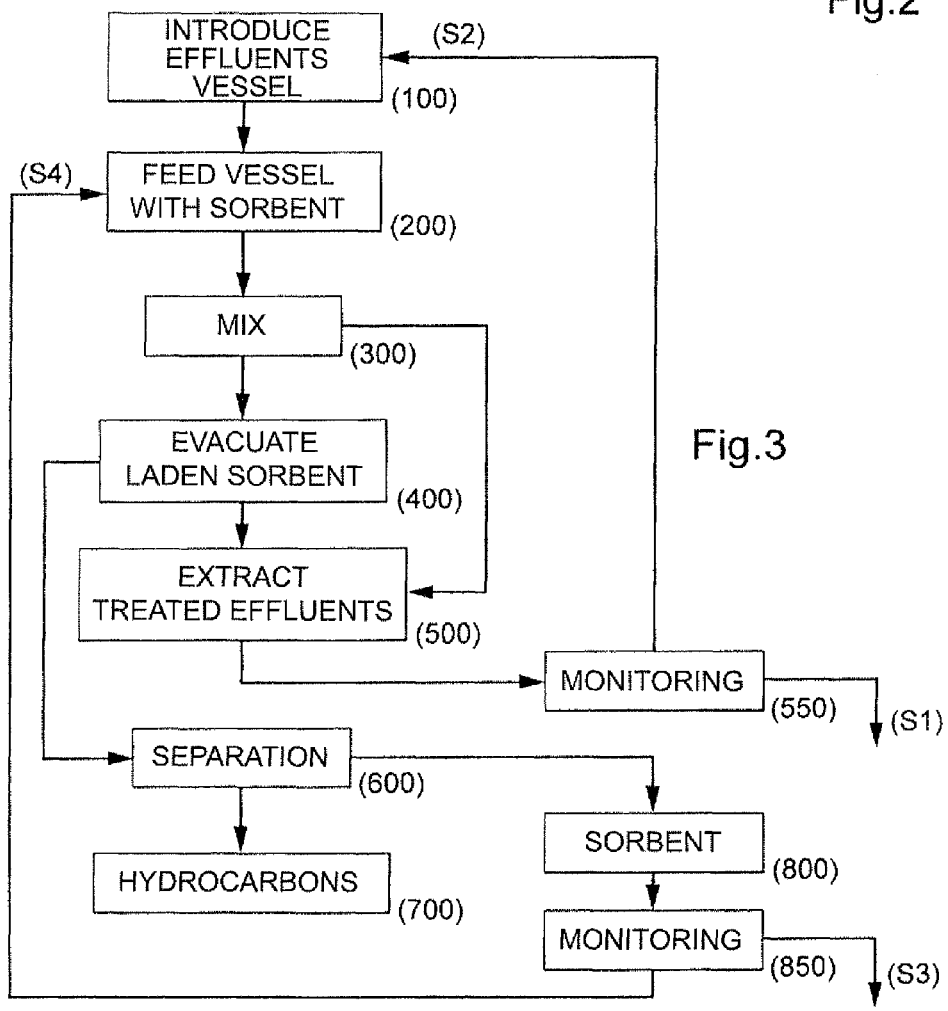

The invention and its advantages will appear with further details in the following description with an embodiment provided as an illustration with reference to the attached drawings which represent:

FIG. 1 illustrates an embodiment of a treatment facility according to the invention, FIG. 2 illustrates a detail of the treatment vessel of the treatment facility of FIG. 1 in a view along line C-C, FIG. 3 is a flowchart relating to steps of an implementation example of the treatment method according to the invention, FIG. 4 illustrates another embodiment of a treatment facility according to the invention, and FIG. 5 schematically illustrates two embodiments of a treatment system according to the invention, comprising a first and a second treatment facility according to the invention.

Structurally and functionally identical elements that are present in several different drawings are designated with the same reference numbers.

The treatment facility I1 according to the invention and illustrated for example in FIG. 2 has a treatment vessel 1 containing a reversible sorbent 2. This reversible sorbent 2 enables the hydrocarbons with which it is in contact to be trapped by the surface effect, while remaining hydrophobic.

Its reversibility enables it to desorb a certain number of times and be reused under conditions close to those existing when it was in the virgin state. The reversible sorbent 2 is preferably designed starting from a foamed plastic of the polypropylene, polyethylene, or polystyrene type or any other material with similar characteristics that is expanded and ground into a granular form.

The treatment vessel 1 also contains liquid effluents 3 laden with hydrocarbons 3b. The effluents 3 are brought through a pipe 1a and introduced into treatment vessel 1 from the top, schematically in the direction of arrows A.

A mixer 4, driven by a motor 5, is disposed in treatment vessel 1. The mixer 4 enables homogenized diffusion of reversible sorbent 2 in effluents 3 to be treated.

According to one embodiment, the facility has a gas or air injection system called a bubbler at the bottom of the treatment vessel 1 to favor separation of the liquid and solid phases in treatment vessel 1 and to improve the surfactant trapping properties of the reversible sorbent 2.

The treatment facility also has a system 6 supplying a virgin reversible sorbent 2. The feed system 6 has a reservoir 7 containing the reversible sorbent 2 and a screw conveyor 8 driven by a motor 9 to convey and introduce said reversible sorbent 2 at the bottom of treatment vessel 1.

The treatment facility also has a additional system 10 feeding in recycled reversible sorbent 2. The additional feed system 10 has a reservoir 11 containing the recycled reversible sorbent 2 and a screw conveyor 12 driven by a motor 13 to convey and introduce said recycled reversible sorbent 2 at the bottom of treatment vessel 1. The reservoir 11 is fed with the reversible sorbent 2 that has undergone at least one desorption after at least one pass in the treatment vessel 1.

The treatment facility according to the invention also has, on the one hand, a means for evacuating the hydrocarbon-laden reversible sorbent 2 at the top part of the treatment vessel 1 and, on the other hand, a means for conducting said laden reversible sorbent 2 to a desorption system.

The evacuation means and the conduction means are made for example with the aid of a screw conveyor 14 driven by a motor 15.

The desorption system, of the mechanical type in the present embodiment, has for example a metering screw 16 operating with a calibrated discharge valve 17 that moves against the spring force of a spring 18 whose tension is adjustable. Rotation of the metering screw 16 is provided for example by motor 15. The desorption system thus enables the hydrocarbons 3b to be recovered in the liquid phase in a container 19 and the desired reversible sorbent in the solid phase in an additional container 20.

According to another embodiment, the centrifugal mechanical desorption system has a mechanism for rotating the treatment vessel 1, which is mounted on a vertical or horizontal shaft. The treatment vessel 1 is then made to rotate when the decanted effluents have been extracted from said treatment vessel 1. A second treatment vessel 1 can then take over to provide continuity in the treatment method according to the invention.

As the case may be, the reversible sorbent 2 leaving the desorption system can be rerouted with suitable means to reservoir 11 for reutilization purposes. The rerouting means are shown by arrows S4.

A means for extracting the treated effluents 3a is provided at the bottom of the treatment vessel. Extraction is shown by arrow S1.

According to one embodiment, the treatment facility also has a system for adding a solvent 21 coming from a solvent reservoir 22. The solvent 21 is mixed with the hydrocarbon-laden reversible sorbent 2 at the rerouting means upstream of the desorption system.

In such an embodiment, the treatment facility also has a distiller-evaporator 23 to separate the solvent 21 from the hydrocarbons 3b, which are recovered in a hydrocarbon reservoir 24.

The gaseous solvent or solvents 21 are condensed in a condenser 25 and sent to the solvent reservoir 22 by means of a pump 26, for reutilization purposes.

According to one embodiment, illustrated in FIG. 2, the treatment vessel 1 is surmounted by two perforated walls 27 that slope so that they converge upward in the direction of a substantially central position above the treatment vessel 1. One of the walls 27 advantageously delimits a recess 28 for the screw conveyor 14 and the metering screw 16.

According to one embodiment, the treatment facility has a means for monitoring the hydrocarbon concentration of the effluents 3 to be treated.

According to one embodiment, the treatment facility also has a means for monitoring the residual hydrocarbon concentration of the effluents extracted at the bottom of the treatment vessel 1.

The treatment facility according to the invention can also have a means for monitoring the ability of the recycled reversible sorbent 2 to trap hydrocarbons. This monitoring means ensures a minimal effectiveness of the reversible sorbent 2, reused after one or more treatment cycles. This monitoring means of the desired reversible sorbent 2 may be a dimensional, physical, or other check, for example a density check.

According to one embodiment, the treatment facility has means for controlling the feeding of reversible sorbent 2 into the treatment vessel, for example according to the initial hydrocarbon concentration in the effluents to be treated. This monitoring means, operated by a computer for example, ensures optimum functioning, continuous or in cycles, of the treatment facility according to the invention.

Advantageously, a three-way valve 29, operated automatically according to the residual hydrocarbon concentration in the treated effluents, selects either a direct evacuation path to a purification system, shown schematically by arrow S1, or a rerouting path to the treatment vessel 1, shown schematically by arrow S2.

FIG. 3 illustrates several steps or phases of an exemplary embodiment of the continuous treatment method according to the invention with the aid of a treatment facility I1 (see FIG. 1) or I2 (see FIG. 4).

In step 100, the effluents 3 to be treated are conducted to treatment vessel 1.

In step 200, the treatment vessel 1 is supplied with a reversible sorbent 2 with a given particle size and in step 300 the effluents 3 are mixed with the reversible sorbent 2 in the treatment vessel 1 to charge said reversible sorbent 2 to trap the hydrocarbons 3b contained in the effluents 3 on the reversible sorbent 2.

The charged reversible sorbent 2 trapping the hydrocarbons accumulates, due to its density, at the top of the treatment vessel 1. Then, in step 400, the hydrocarbon-laden reversible sorbent 2 is evacuated from the treatment vessel 1.

The treated effluents 3a, purified of the hydrocarbons, are at this point located in the bottom of the treatment vessel 1 and, in step 500, said treated effluents 3a can be extracted from the bottom of the treatment vessel 1.

In step 600, the hydrocarbons 3b are separated from the charged reversible sorbent 2 coming from the treatment vessel 1, by a mechanical desorption operation of the compression or centrifugation type or by any other operation designated above.

The hydrocarbons 3b thus recovered and the desorbed reversible sorbent 2 are then stored in steps 700 and 800, respectively.

According to one embodiment of the invention, the treatment method consists of using the reversible sorbent 2 separated from the hydrocarbons 3b to be reintroduced into the treatment vessel 1.

According to one embodiment of the invention, the treatment method consists of introducing, into treatment vessel 1, a given amount of reversible sorbent 2 composed at least in part of the reversible sorbent 2 already used and desorbed at least once.

The treatment method consists, in a monitoring step 550, of checking the residual concentration of hydrocarbons 3b in the treated effluents 3a extracted from the treatment vessel 1. When this residual concentration is less than a given threshold, the treated effluents 3a are evacuated with the wastewater, as indicated by arrow S1. On the other hand, when this residual concentration is still too high, the treated effluents 3a are rerouted to the treatment vessel 1 to undergo a further treatment cycle, as indicated by arrow S2. Selection of the path either in the direction of arrow S1 or in the direction of arrows S2 is preferably done automatically using a three-way valve 29, operated according to the residual hydrocarbon concentration.

According to one embodiment of the invention, the treatment method consists of determining the hydrocarbon concentration 3b of the liquid effluents 3 introduced into the treatment vessel 1 and adjusting the amount of reversible sorbent 2 introduced into said treatment vessel 1 as a function of said concentration.

According to one embodiment of the invention, the treatment method consists, according to one monitoring step 850, of determining the ability of the reversible sorbent 2 to trap the hydrocarbons before a re-use indicated by arrow S4. Assuming that the quality of the desorbed reversible sorbent 2 is satisfactory, it is rerouted to the reservoir 11 of the hopper type. If it is not satisfactory, the reversible sorbent 2 is evacuated for thermal energy recovery or gasification, as indicated by arrow S3.

According to one embodiment of the invention, the treatment method consists of desorbing the reversible sorbent 2 laden with hydrocarbons 3b and removed from treatment vessel 1, having previously injected a solvent so as to mix it with said laden reversible sorbent in order to fluidize said hydrocarbons 3b and facilitate desorption. This is particularly indicated for recovering heavy hydrocarbons 3b. The latter are then mixed with the solvent.

The treatment method then consists of recovering the solvent by evaporation followed by condensation in order to re-use it and not release it into the environment.

The treatment method operates for example continuously or in cycles. A cycle corresponds to filling of the treatment vessel 1 by the effluents 3 to be treated.

In the case of large concentrations of hydrocarbons 3b, it is possible to use two treatment facilities I1 or I2 in series to improve the effectiveness of treatment. The treated effluents 3a leaving a first treatment vessel 1 are then introduced into a second treatment vessel 1 to undergo a further treatment cycle.

The treatment facility according to the invention can be made in mobile form so that it can move from site to site where hydrocarbon-laden effluents need to be treated.

According to one embodiment illustrated in FIG. 4, the treatment facility I2 according to the invention has a feed tube T through which the effluents to be treated are forced to flow in the direction of arrow A. The feed system 6 introduces the reversible sorbent 2 directly into the feed tube T, which leads for example to the bottom of treatment vessel 1.

A means generating an eddy, of the vortex type 4v, is inserted into the feed tube T downstream of the injection point of the reversible sorbent 2. The means generating a vortex 4v enables better homogenization to be achieved in the dispersion of reversible sorbent 2 in the liquid effluents to be treated.

The flowrate in the feed tube T is chosen such that the liquid effluents are able to overcome the buoyancy of the reversible sorbent 2 injected into the feed tube T that has a lower density than the effluents. The length of the feed tube T is chosen to ensure a optimal contact time between the reversible sorbent 2 and the effluents before their introduction into the treatment vessel 1 preferably in a lower part.

The reversible sorbent 2 then rises to the top of the treatment vessel 1, trapping hydrocarbons contained in the effluents.

Once treated, the effluents pass into a filter F before being extracted from treatment vessel 1, along pathways shown schematically by arrows S1 or S2 previously described with reference to FIG. 1.

FIG. 5 illustrates schematically a system for treating liquid hydrocarbon-laden effluents, particularly to implement the treatment method presented above, said treatment system having a first treatment facility I1 as described above as well as an effluent pretreatment or posttreatment unit that are respectively upstream or downstream of the first treatment facility I1, said pretreatment or posttreatment unit having a second treatment facility I2 as described above.

The use of a pretreatment unit enables the effluents designated by E, to be treated to be introduced into the second treatment facility I2 before being collected at the outlet of said second treatment facility I2 to be routed to the first treatment facility I1. The latter then discharges the treated effluents ET.

The use of a posttreatment unit enables the effluents E to be treated to be introduced into the first treatment facility I1 before being collected at the outlet of said first treatment facility I1 to be routed to the second treatment facility I2. The latter then discharges the treated effluents ET.

The treatment method according to the invention has the advantage of recovering and reusing the functional components, namely the reversible sorbent 2, solvent, and water. In addition, no chemicals or toxins are released into the environment. The treated effluents 3a, generally purified water, are eliminated by the purification system and the hydrocarbons 3b as well as the reversible sorbent 2 at the end of their life are either used for thermal energy recovery or gasified.

Of course, the present invention is subject to numerous variations regarding its implementation. Although numerous embodiments have been described, it will be understood that it is inconceivable to list every single possible mode. It is of course possible to replace one described means by an equivalent means without departing from the framework of the present invention.

The invention claimed is:

1. An appartus for treating hydrocarbon-laden liquid effluents for implementing a treatment method, the treatment method comprising:
conducting the effuents into a treatment vessel,
feeding a reversible sorbent with a given particle size into the treatment vessel, the reversible sorbent being configured to desorb a plurality of times and be reused, the reversible sorbent comprising a foamed plastic;
mixing the effluents with the reversible sorbent to charge the reversible sorbent with hydrocarbons cotained in the effluents, to obtain hydrocarbon-laden reversible sorbent and treated effluents,
evacuating the hydrocarbon-laden reversible sorbent at a top of the treatment vessel,
extracting the treated effluents from the treatment vessel,
separating the hydrocarbons the hydrocarbon-laden reverisble sorbent coming from the treatment vessel,
using the reversible sorbent separted from the hydrocabons and reintroducing it into the treatment vessel, and
determining the ability of the reversible sorbent to trap the hydrocarbons before reuse;
the apparatus comprising:
a treatment vessel to recover the hydrocarbon-laden liquid effluents,
a system for feeding the treatment vessel with virgin reversible sorbent,
an additional system for feeding the treatment vessel with recycled reversible sorbent,
a mixer disposed in the treatment vessel to mix the liquid phase of the effluents and the solid phase of the reversible sorbent designed to trap the hydrocarbons,
a means for evacuating the hydrocarbon-laden reversible sorbent at the top of the treatment vessel,
a means for bringing the reversible sorbent that trapped the hydrocarbons to a desorption system,
a means for extracting the treated liquid effluents at the bottom of the treatment vessel, and
means for separate recovery of the hydrocarbons and reversible sorbent coming from the desorption system,
wherein the treatment vessel is surmounted by two perforated sloping walls that converge to an essentially central position in which is disposed the evacuation means of a screw conveyor type, whereby the effluents to be treated penetrate the treatment vessel through the perforated walls.

2. The apparatus according to claim 1, futher comprising a means for rerouting the reversible sorbent coming from and treated by a desorption system into the treatment vessel.

3. The apparatus according to claim 1, futher comprising a system for adding solvent to the reversible sorbent trapping hydrocarbons and evacuated from the treatment vessel.

4. The apparatus according to claim 3, further comprising, downstream of the hydrocarbon recovery means, a distiller-evaporator for separating the solvent from the hydrocarbons and a condenser for recovering the solvent for reutilization purposes.

5. The apparatus according to claim 1, further comprising a means for monitoring the hydrocarbon concentration of the effluents to be treated.

6. The apparatus according to claim 5, further comprising means for controlling the reversible sorbent feed into the treatment vessel as a function of the hydrocarbon concentration in the effluents to be treated.

7. The apparatus according to claim 1, further comprising a means for monitoring the ability of the recycled reversible sorbent to trap hydrocarbons.

8. The apparatus according to claim 1, further comprising a means for monitoring the residual hydrocarbon concentration of the effluents extracted at the bottom of the treatment vessel.

9. The apparatus according to claim 1, having at least one centrifugal treatment vessel mounted on a rotating shaft that is vertical or horizontal for example and rotated by driving means, to desorb, by centrifugation, the hydrocarbon-laden reversible sorbent contained in said treatment vessel.

10. The apparatus according to claim 1, further comprising a system for injecting a gas into the treatment vessel at the bottom of the treatment vessel, thus generating a bubbling phenomenon.

11. A system for treating hydrocarbon-laden liquid effluents, comprising:
- a first treatment apparatus according to claim 1;
- a unit for effluent pretreatment or posttreatment upstream or downstream respectively of the first treatment apparatus, said pretreatment or posttreatment unit having a second treatment apparatus for treating hydrocarbon-laden liquid effluents, the second treatment facility comprising:
    - a treatment vessel for recovering the hydrocarbon-laden liquid effluents with the aid of a feed tube leading into the treatment vessel,
    - a system for feeding the treatment vessel with virgin or recycled reversible sorbent, said feed system injecting the reversible sorbent into the feed tube,
    - a means for generating a vortex in the feed tube downstream of the injection of the reversible sorbent, favoring the mixing of the effluent liquid phase with the reversible sorbent solid phase,
    - a means for evacuating the reversible sorbent trapping the hydrocarbon at the top of the treatment vessel,
    - a means for conducting the reversible sorbent trapping the hydrocarbons to a desorption system,
    - a means for extracting the liquid effluents treated in the treatment vessel, and
- means for separate recovery of the hydrocarbons and the reversible sorbent coming from the desorption system.

* * * * *